US012332590B2

(12) United States Patent
Saeki

(10) Patent No.: US 12,332,590 B2
(45) **Date of Patent: *Jun. 17, 2025**

(54) FIXING DEVICE

(71) Applicant: Toshiba Tec Kabushiki Kaisha, Tokyo (JP)

(72) Inventor: Ryota Saeki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,750

(22) Filed: Jan. 11, 2024

(65) Prior Publication Data

US 2024/0142905 A1 May 2, 2024

Related U.S. Application Data

(63) Continuation of application No. 17/943,656, filed on Sep. 13, 2022, now Pat. No. 11,906,917.

(51) Int. Cl.
*G03G 15/20* (2006.01)

(52) U.S. Cl.
CPC .................................. *G03G 15/2053* (2013.01)

(58) Field of Classification Search
CPC .................................................. G03G 15/2053
See application file for complete search history.

(56) References Cited

U.S. PATENT DOCUMENTS 11,906,917 B1 * 2/2024 Saeki ................. G03G 15/2053
2009/0304421 A1 12/2009 Saito et al.
2015/0338804 A1 * 11/2015 Nakashima ............ H05B 3/141 219/216
2018/0164723 A1 6/2018 Yamamoto et al.
2021/0286296 A1 9/2021 Ikeno

FOREIGN PATENT DOCUMENTS

JP 2001-100556 A 4/2001
JP 2017-116571 A 6/2017

OTHER PUBLICATIONS

Non-Final Office Action on U.S. Appl. No. 17/943,656 DTD Jun. 23, 2023.
Notice of Allowance on U.S. Appl. No. 17/943,656 DTD Oct. 12, 2023.

* cited by examiner

*Primary Examiner* — Carla J Therrien
(74) *Attorney, Agent, or Firm* — FOLEY & LARDNER LLP

(57) ABSTRACT

A fixing device includes a tubular member extending in an axial direction, a substrate, and a support. The substrate has a first surface facing toward an inner surface of the tubular member in a first thickness direction. The substrate includes a cut section at which the substrate is disconnected from a base material. The cut section is positioned at an end portion of the substrate in a first lateral direction. The substrate extends longitudinally along the axial direction. The support is in contact with the inner surface of the tubular member. The support includes a projection longitudinally overlapping at least a portion of the cut section and a low section longitudinally offset from the projection. The projection extends further in the first thickness direction than the low section and the first surface.

20 Claims, 9 Drawing Sheets

FIXING DEVICE

CROSS-REFERENCE TO RELATED PATENT APPLICATION

This application is a Continuation of U.S. application Ser. No. 17/943,656, filed on Sep. 13, 2022, the entire disclosure of which is hereby incorporated by reference herein.

FIELD

Embodiments described herein relate generally to a fixing device.

BACKGROUND

An image forming apparatus disposed in a workplace forms an image on a sheet. The image forming apparatus includes a fixing device. The fixing device heats and pressurizes a toner image on the sheet and fixes the toner image on the sheet. There has been a demand for a fixing device that can suppress damage.

DETAILED DESCRIPTION

A fixing device in an embodiment includes a tubular member extending in an axial direction, a heater, and a support. The heater has a first surface in contact with an inner surface of the tubular member. The first surface faces in a first thickness direction. The heater includes a substrate. The substrate includes a cut section at which the substrate is disconnected from a base material. The cut section is positioned at an end portion of the substrate in a first lateral direction. The substrate extends longitudinally along the axial direction. The support is in contact with the inner surface of the tubular member. The support includes a projection longitudinally overlapping at least a portion of the cut section and a low section longitudinally offset from the projection. The projection extends further in the first thickness direction than the low section and the first surface.

Figure 1:
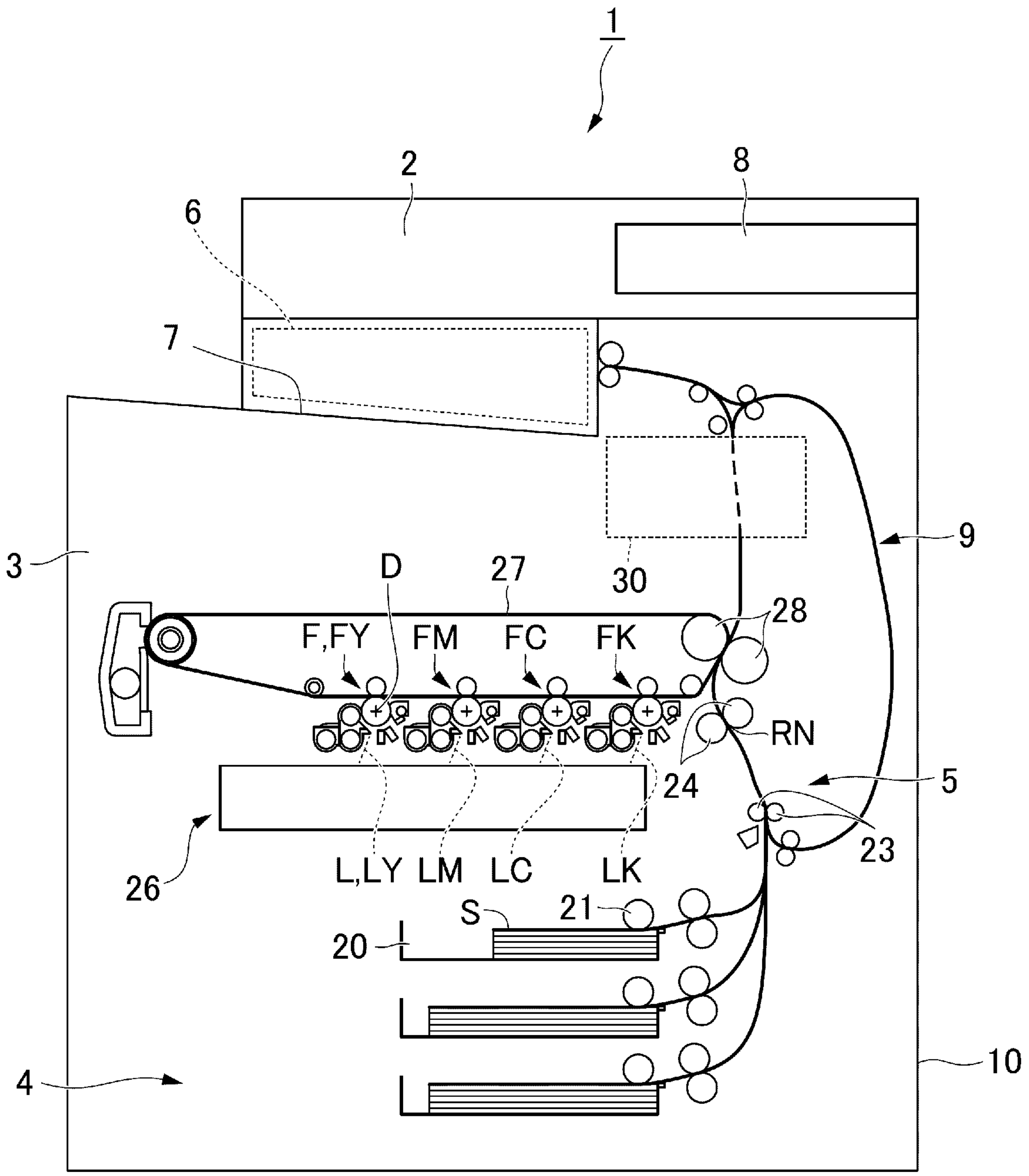
FIG. 1 is a schematic configuration diagram of an image processing apparatus.

A fixing device according to an embodiment is explained below with reference to the drawings. FIG. 1 is a schematic configuration diagram of an image forming apparatus. An image forming apparatus 1 (e.g., disposed in a workplace) performs processing for forming an image on a sheet S. The sheet S may be paper. The image forming apparatus 1 includes a housing 10, a scanner section 2, an image forming unit 3, a sheet supplying section 4, a conveying section 5, a reversing unit 9, a tray 7, a control panel 8, and a control section 6.

The housing 10 (e.g., a frame, a chassis, etc.) forms the exterior of the image forming apparatus 1. The scanner section 2 (e.g., a scanner) reads image information of a copying target object based on brightness and darkness of light and generates an image signal. The scanner section 2 outputs the generated image signal to the image forming unit 3. The image forming unit 3 (e.g., a printer) forms a toner image based on an image signal received from the scanner section 2 or an exterior source. The toner image is an image formed by toner or another material. The image forming unit 3 transfers the toner image onto the surface of the sheet S. The image forming unit 3 heats and pressurizes the toner image on the surface of the sheet S and fixes the toner image on the sheet S.

The sheet supplying section 4 (e.g., a sheet tray assembly, a sheet supply) supplies sheets S to the conveying section 5 one by one according to timing when the image forming unit 3 forms the toner image. The sheet supplying section 4 includes sheet storing sections 20 (e.g., sheet trays) and pickup rollers 21. The sheet storing sections 20 store the sheets S of predetermined sizes and types. The pickup rollers 21 take out the sheets S one by one from the sheet storing sections 20. The pickup rollers 21 supply the taken-out sheets to the conveying section 5.

The conveying section 5 (e.g., a conveyor) conveys the sheet S supplied from the sheet supplying section 4 to the image forming unit 3. The conveying section 5 includes conveying rollers 23 and registration rollers 24. The conveying rollers 23 convey the sheet S supplied from the pickup rollers 21 to the registration rollers 24. The conveying rollers 23 butt the leading end in a conveying direction of the sheet S against a nip RN of the registration rollers 24. The registration rollers 24 bend the sheet S in the nip RN to thereby align the position of the leading end of the sheet S in the conveying direction. The registration rollers 24 convey the sheet S according to timing when the image forming unit 3 transfers the toner image onto the sheet S.

The image forming unit 3 is explained. The image forming unit 3 includes a plurality of image forming sections F, a laser scanning unit 26, an intermediate transfer belt 27, a transfer section 28, and a fixing device 30. The image forming sections F include photoconductive drums D. The image forming sections F form toner images corresponding to image signals on the photoconductive drums D. A plurality of image forming sections FY, FM, FC, and FK respectively form toner images by yellow, magenta, cyan, and black toners.

Charging devices charge the surfaces of the photoconductive drums D. Developing devices store developers including the yellow, magenta, cyan, and black toners. The developing devices develop electrostatic latent images on the photoconductive drums D in order to form toner images of the colors on the photoconductive drums D.

The laser scanning unit 26 scans the charged photoconductive drums D with laser lights L to expose the photoconductive drums D to the laser lights L. The laser scanning unit 26 exposes the photoconductive drums D of the image forming sections FY, FM, FC, and FK for the colors with respective laser lights LY, LM, LC, and LK in order to form electrostatic latent images on the photoconductive drums D.

The toner images on the surfaces of the photoconductive drums D are primarily transferred onto the intermediate transfer belt 27. The transfer section 28 (e.g., a transfer assembly) transfers the toner images, which are primarily transferred onto the intermediate transfer belt 27, onto the surface of the sheet S in a secondary transfer position. The fixing device 30 heats and pressurizes the toner images transferred on the sheet S to fix the toner images on the sheet S.

The reversing unit 9 reverses the sheet S in order to form an image on the rear surface of the sheet S. The reversing unit 9 reverses the sheet S discharged from the fixing device 30 by switching back the sheet S. The reversing unit 9 conveys the reversed sheet S toward the registration rollers 24. The discharged sheet S on which an image is formed is placed on the tray 7. The control panel 8 is a part of an input section that inputs information for an operator to operate the image forming apparatus 1. The control panel 8 includes a touch panel and various hard keys. The control section 6 controls the operations of the sections of the image forming apparatus 1.

Figure 2:
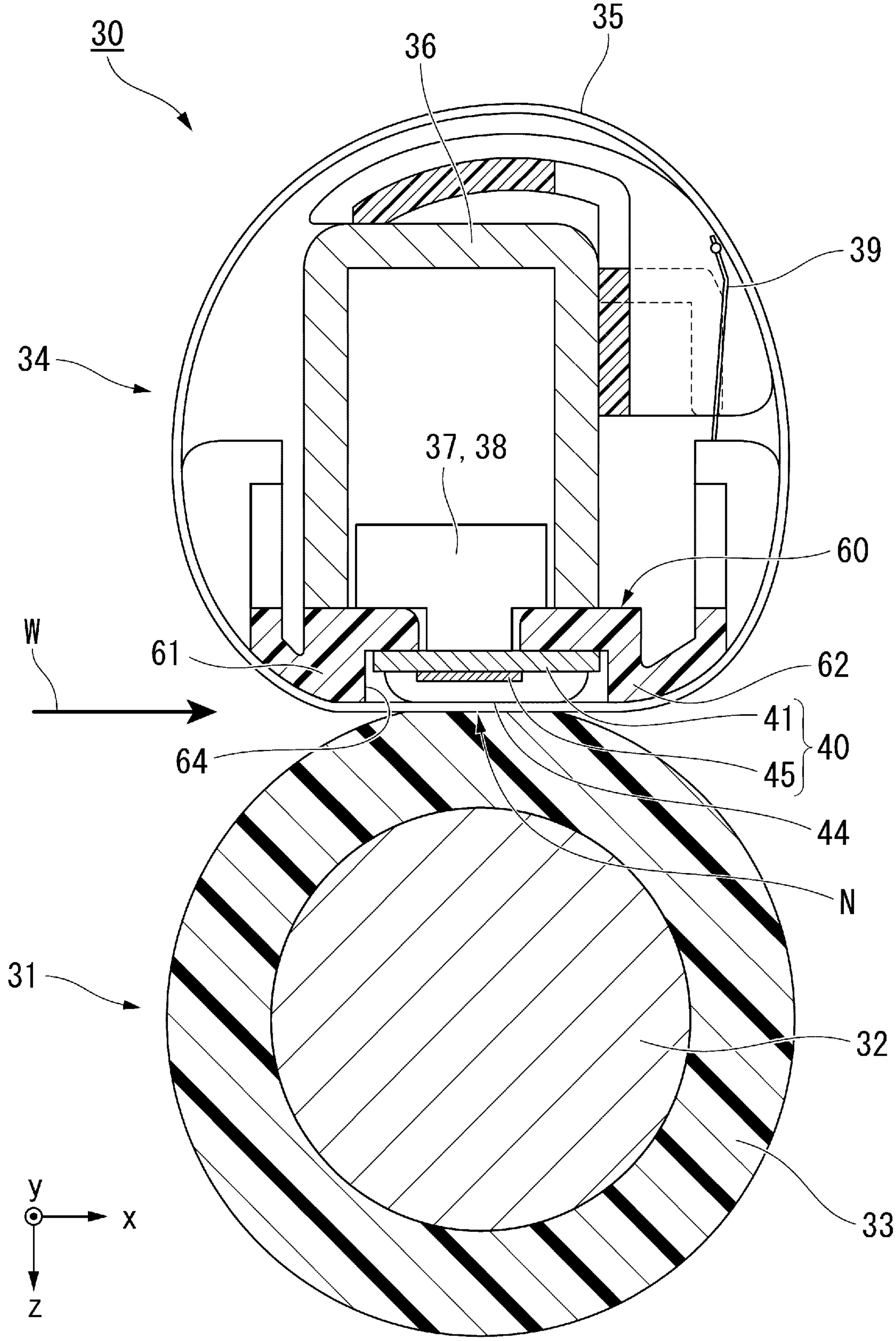
FIG. 2 is a section view of a fixing device.

The fixing device 30 is explained in detail. FIG. 2 is a section view of the fixing device. The fixing device 30 includes a pressurizing roller (e.g., a pressurizing body) 31 and a heating roller 34. A nip N is formed between the pressurizing roller 31 and the heating roller 34.

In this application, a z direction (e.g., a first direction, a thickness direction), an x direction (e.g., a third direction, a lateral direction), and a y direction (e.g., a second direction, a longitudinal direction) are defined as follows. The z direction is the thickness direction of a substrate 41 and is a direction in which the heating roller 34 and the pressurizing roller 31 are arranged. A +z direction (e.g., a first side in the first direction, a first thickness direction, a positive thickness direction) is a direction from the heating roller 34 toward the pressurizing roller 31. A −z direction (e.g., a second side in the first direction, a second thickness direction, a negative thickness direction) is the opposite direction of the +z direction. The x direction is the lateral direction of the substrate 41 and is the conveying direction of the sheet S in the nip N. A −x direction (e.g., one side in the third direction, a first lateral direction, a positive lateral direction) is an upstream side in the conveying direction of the sheet S. A +x direction (e.g., the other side in the third direction, a second lateral direction, a negative lateral direction) is the opposite direction of the −x direction. The y direction is the longitudinal direction of the substrate 41 and is the axial direction of a tubular film 35 of the heating roller 34. A +y direction (e.g., a first longitudinal direction, a positive longitudinal direction) and an opposing −y direction (e.g., a second longitudinal direction, a negative longitudinal direction) are defined based on the y direction.

The pressurizing roller 31 pressurizes a toner image on the sheet S that entered the nip N. The pressurizing roller 31 includes a cored bar 32 and an elastic layer 33 (e.g., a compliant layer). The configuration of the pressurizing roller 31 is not limited to the above and can be various configurations.

The cored bar 32 is formed of a metal material such as stainless steel in a columnar shape. The elastic layer 33 is formed of an elastic material such as silicone rubber. The elastic layer 33 has fixed thickness on the outer circumferential surface of the cored bar 32. A release layer may be made of a resin material such as a tetrafluoroethylene-perfluoroalkyl vinyl ether copolymer (e.g., a PFA) and present on the outer circumferential surface of the elastic layer 33.

The pressurizing roller 31 is driven by a motor to rotate. If the pressurizing roller 31 rotates in a state in which the nip N is formed, the tubular film 35 of the heating roller 34 rotates following the rotation of the pressurizing roller 31. The pressurizing roller 31 conveys the sheet S in a conveying direction W by rotating in a state in which the sheet S is present in the nip N.

The heating roller 34 heats the toner image on the sheet S that entered the nip N. The heating roller 34 includes the tubular film (e.g., a tubular body, a tubular member, a tube, etc.) 35, a heater unit 40 (e.g., a heater assembly, a heater, etc.), a supporting member 60, a frame 36, and thermosensitive elements 37 to 39. The configuration of the heating roller 34 is not limited to the above and can be various configurations.

The tubular film 35 has a tubular shape (e.g., an elongated annular shape). The tubular film 35 includes a base layer, an elastic layer, and a release layer in order from the inner circumference side. The base layer is formed of a resin material such as polyimide (PI) in order to achieve low heat capacity. The elastic layer is formed of an elastic material such as silicone rubber. The release layer is formed of a material such as PFA resin.

Figure 3:
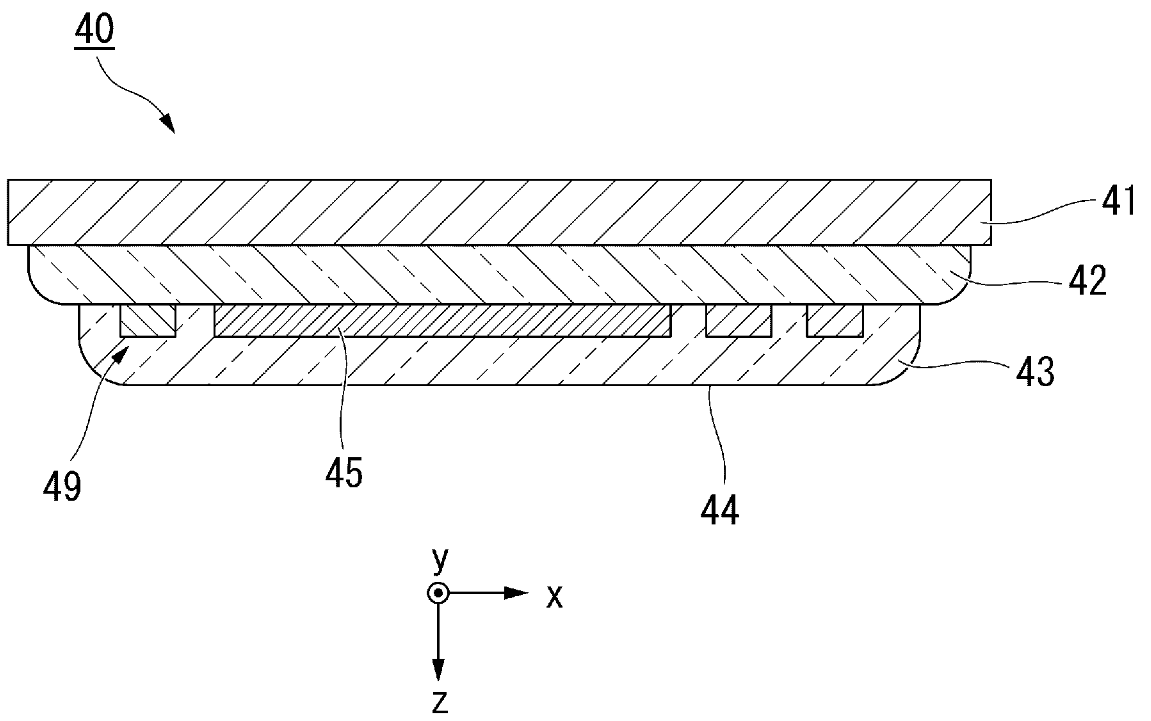
FIG. 3 is a section view of a heater unit taken along a line in FIG. 4.
Figure 4:
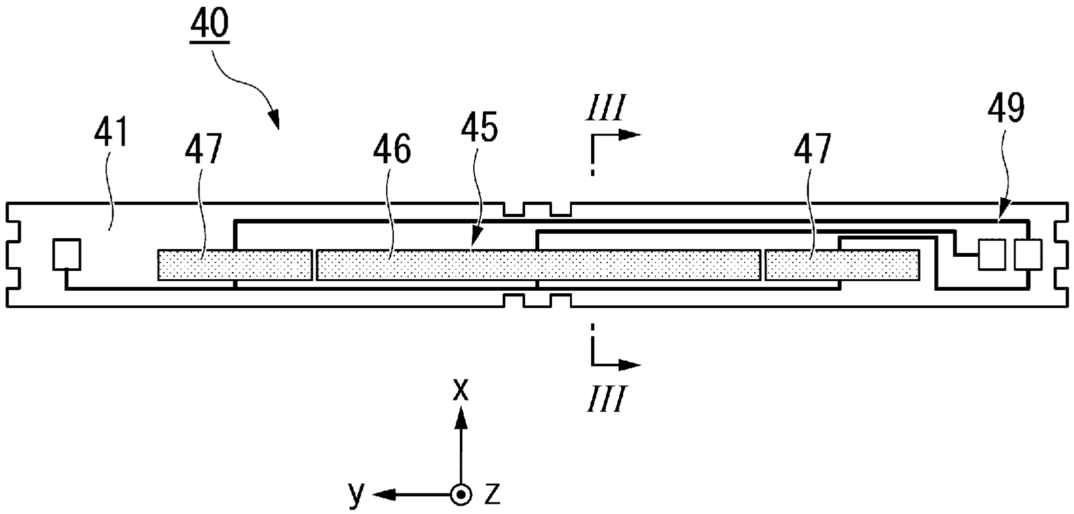
FIG. 4 is a plan view of the heater unit.

The heater unit 40 is present on the inner side of the tubular film 35 (e.g., within an inner volume of the tubular film). The heater unit 40 is in contact with the inner surface of the tubular film 35 through grease on a first surface 44 in the +z direction. FIG. 3 is a section view of the heater unit taken along a line in FIG. 4. FIG. 4 is a plan view (e.g., a view from the +z direction) of the heater unit. The heater unit 40 includes the substrate 41, a heat generating body 45, and a wire 49.

The substrate 41 (e.g., a frame, a chassis, etc.) is formed of, for example, a metal material such as stainless steel or a ceramic material such as aluminum nitride. As illustrated in FIG. 4, the substrate 41 has an elongated rectangular plate shape. The heater unit 40 is disposed with the longitudinal direction of the substrate 41 aligned with the axial direction of the tubular film 35. As illustrated in FIG. 3, a first electric insulating layer 42 is formed of a glass material or the like on the surface in the +z direction of the substrate 41. A first electric insulating layer may be formed in the −z direction of the substrate 41 like the first electric insulating layer 42 formed in the +z direction of the substrate 41.

The heat generating body 45 (e.g., a heating element) is formed of a silver palladium alloy or the like. The heat generating body 45 (e.g., a resistive heater) generates heat by being energized (e.g., provides thermal energy in response to receiving an electrical current). The heat generating body 45 and the wire 49 are disposed on the surface in the +z direction of the substrate 41 through the first electric insulating layer 42 (e.g., the first electric insulating layer 42 extends between (a) the substrate 41 and (b) the heat generating body 45 and the wire 49). A second electric insulating layer (e.g., an electric insulating layer) 43 is formed of a glass material or the like to cover the heat generating body 45 and the wire 49. A second electric insulating layer may be formed in the −z direction of the substrate 41 like the second electric insulating layer 43 formed in the +z direction of the substrate 41.

As illustrated in FIG. 4, the heat generating body 45 includes a center heat generating body 46 (e.g., a center portion or center section) and a pair of end heat generating bodies 47 (e.g., end portions or end sections). The center heat generating body 46 is present in the center in the y direction. The pair of end heat generating bodies 47 is present at both the end portions in the y direction of the center heat generating body 46. The sheet S passes through the nip N of the fixing device 30 with the center in the y direction of the sheet S aligned with the center in the y direction of the fixing device 30. For example, in the case of the sheet S having a relatively small width in the y direction, the control section 6 causes only the center heat generating body 46 to generate heat. For example, in the case of the sheet S having a relatively large width in the y direction, the control section 6 causes the entire center heat generating body 46 and the entire pair of end heat generating bodies 47 to generate heat. The center heat generating body 46 and the pair of end heat generating bodies 47 are controlled to generate heat independently from each other. The pair of end heat generating bodies 47 is controlled to generate heat in the same manner.

Referring again to FIG. 2, the supporting member 60 (e.g., a support, a frame, a chassis, etc.) is present on the inner side of the tubular film 35. The supporting member 60 is formed of, for example, a highly heat resistant resin material such as liquid crystal polymer. The supporting member 60 covers the both the sides of the heater unit 40 in the x direction and covers the heater unit 40 in the −z direction. The supporting member 60 supports the end face in the −z direction of the heater unit 40. A heat transfer member may be disposed between the supporting member 60 and the heater unit 40. The heat transfer member is formed of a metal material or the like having high thermal conductivity such as copper.

The supporting member 60 is present next to the heater unit 40 in the x direction. The supporting member 60 includes an upstream-side supporting section 61 and a downstream-side supporting section 62. The upstream-side supporting section 61 is present in the −x direction of the heater unit 40. The downstream-side supporting section 62 is present in the +x direction of the heater unit 40. The surfaces in the +z direction of the upstream-side supporting section 61 and the downstream-side supporting section 62 are formed as curved surfaces extending along the inner surface of the tubular film 35 and are in contact with the inner surface of the tubular film 35. The upstream-side supporting section 61 and the downstream-side supporting section 62 stabilize a posture at a rotating time of the tubular film 35.

The frame 36 is present on the inner side of the tubular film 35. The frame 36 is formed on a steel sheet material or the like. The frame 36 is attached to the supporting member 60 in the −z direction. The frame 36 extends in the y direction. Both the end portions in the y direction of the frame 36 are fixed to the housing 10 of the image forming apparatus 1. The frame 36 supports the heater unit 40 through the supporting member 60.

The thermosensitive elements 37 to 39 (e.g., a temperature control circuit) include a heater thermometer 37, a thermostat 38, and a film thermometer 39. The heater thermometer 37 and the thermostat 38 are present in the −z direction of the heater unit 40. The heater thermometer 37 measures the temperature of the heater unit 40. If the temperature of the heater unit 40 exceeds a predetermined temperature, the thermostat 38 interrupts energization to the heat generating body 45. The film thermometer 39 comes into contact with the inner circumferential surface of the tubular film 35 and measures the temperature of the tubular film 35. The film thermometer 39 measures the temperature of the tubular film 35 in positions in the y direction corresponding to the center heat generating body 46 and the end heat generating bodies 47.

Figure 5:
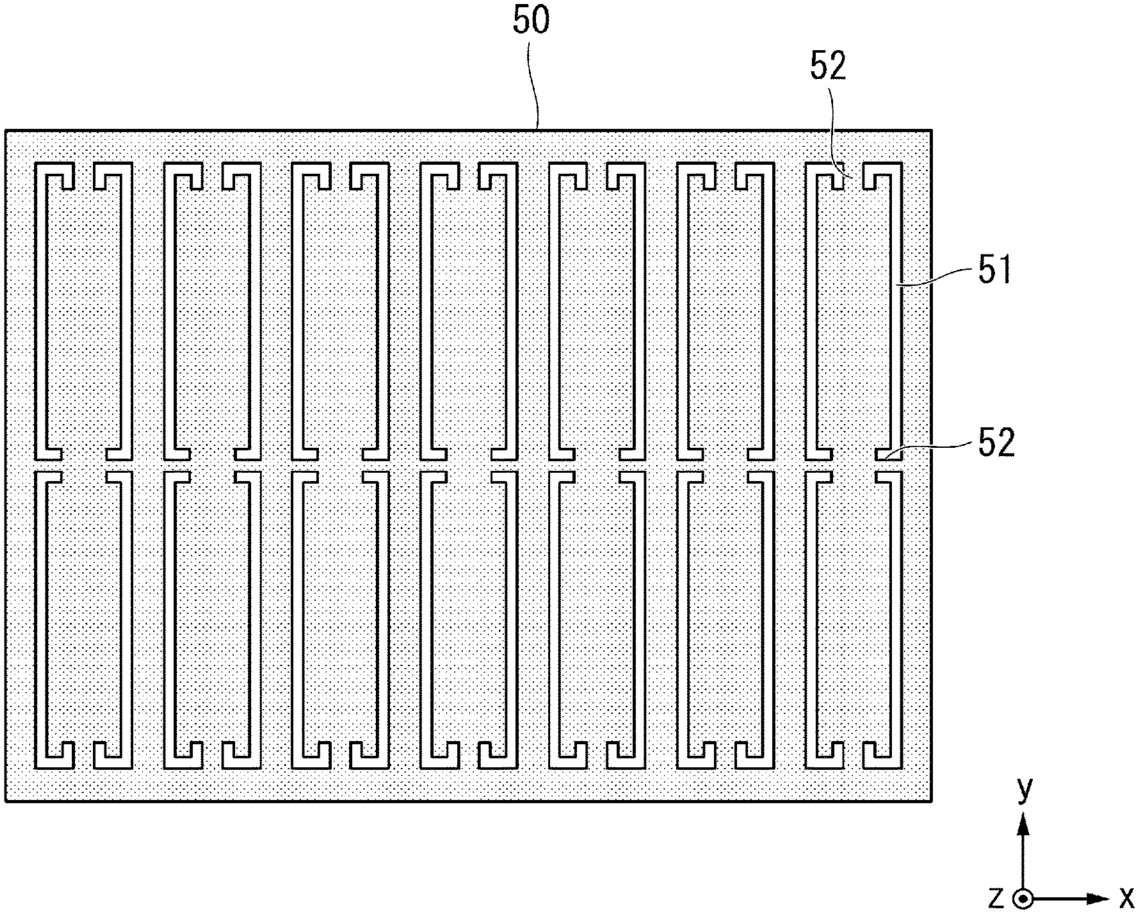
FIG. 5 is a plan view of a base material of a substrate.

FIG. 5 is a plan view of a base material of the substrate used to manufacture multiple substrates 41. The substrate 41 of the heater unit 40 is formed on a base material 50. A plurality of substrates 41 are formed side by side on the base material 50. Slits 51 extending along the external shapes of the substrates 41 are formed on the base material 50. The slits 51 are formed by etching or the like. The substrates 41 are coupled to the base material 50 by coupling sections 52 extending across the slits 51. The heater unit 40 including the substrates 41 is formed in a state in which the substrates 41 are coupled to the base material 50. A manufacturing process for the heater unit 40 is implemented on the surfaces of the substrates 41 coupled to the base material 50. The substrates 41 are separated from the base material 50 and the heater unit 40 is completed. The coupling sections 52 are cut by a cutter and the substrates 41 are separated from the base material 50.

Figure 6:
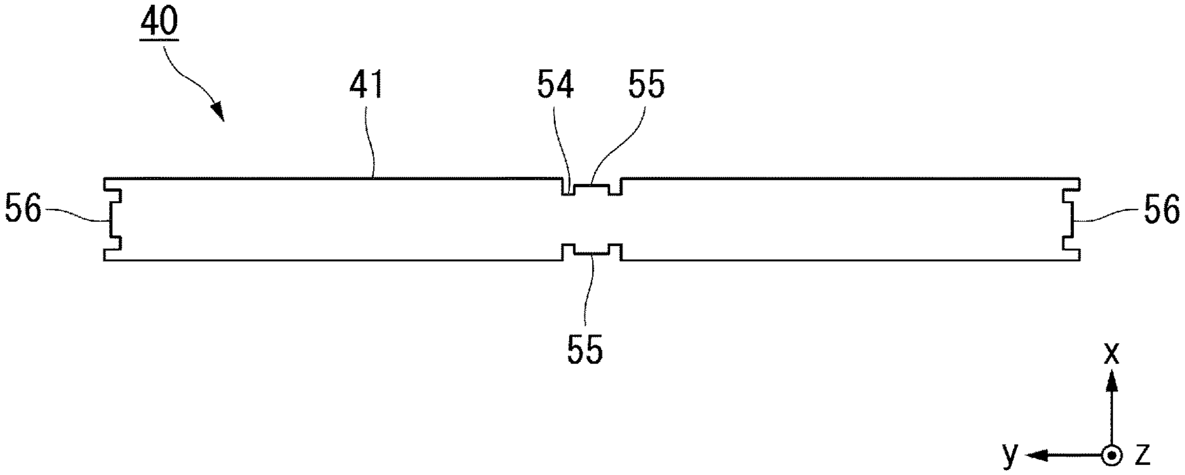
FIG. 6 is a plan view of the heater unit cut from the base material.

FIG. 6 is a plan view of the heater unit cut from the base material. In FIG. 6, the heat generating body 45 and the like on the surface of the substrate 41 are not illustrated. The substrate 41 includes first cut sections 55 and second cut sections 56 (e.g., cut sections) disconnected from the base material 50. The first cut sections 55 are present at both the end portions in the x direction of the substrate 41 in the center in the y direction. The second cut sections 56 are present at both the end portions in the y direction of the substrate 41. The substrate 41 includes cutouts 54 in the outer circumference. The first cut sections 55 and the second cut sections 56 are present on the inner sides of the cutouts 54.

Figure 7:
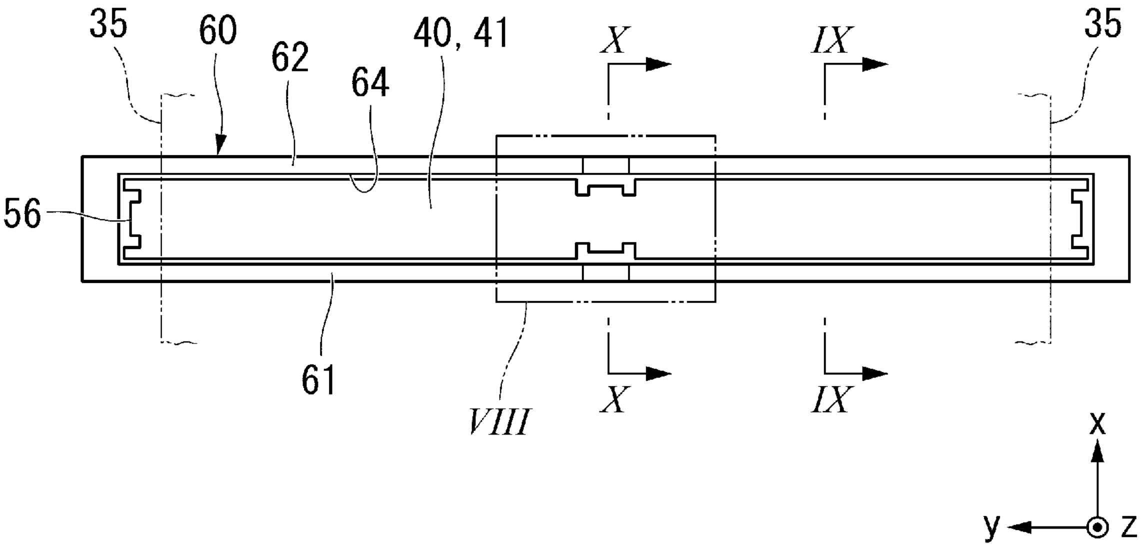
FIG. 7 is a plan view of a supporting member and the heater unit.

FIG. 7 is a plan view of the supporting member and the heater unit. The supporting member 60 includes a recess 64 between the upstream-side supporting section 61 and the downstream-side supporting section 62. The recess 64 is recessed in the −z direction from the end face in the +z direction of the supporting member 60. When viewed from the +z direction, the recess 64 has a rectangular shape. The heater unit 40 is housed on the inner side of the recess 64. The bottom surface of the recess 64 supports the end face in the −z direction of the heater unit 40. The upstream-side supporting section 61 is present next to the heater unit 40 in the −x direction. The downstream-side supporting section 62 is present next to the heater unit 40 in the +x direction.

Figure 8:
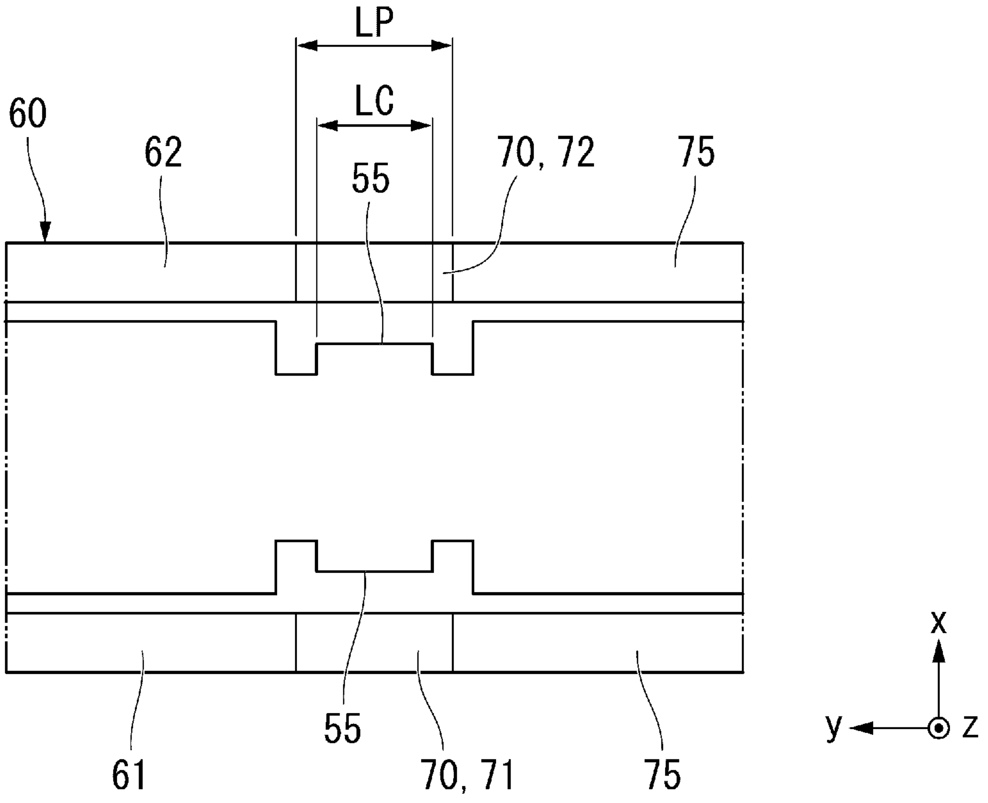
FIG. 8 is an enlarged view of a VIII part of FIG. 7.
Figure 9:
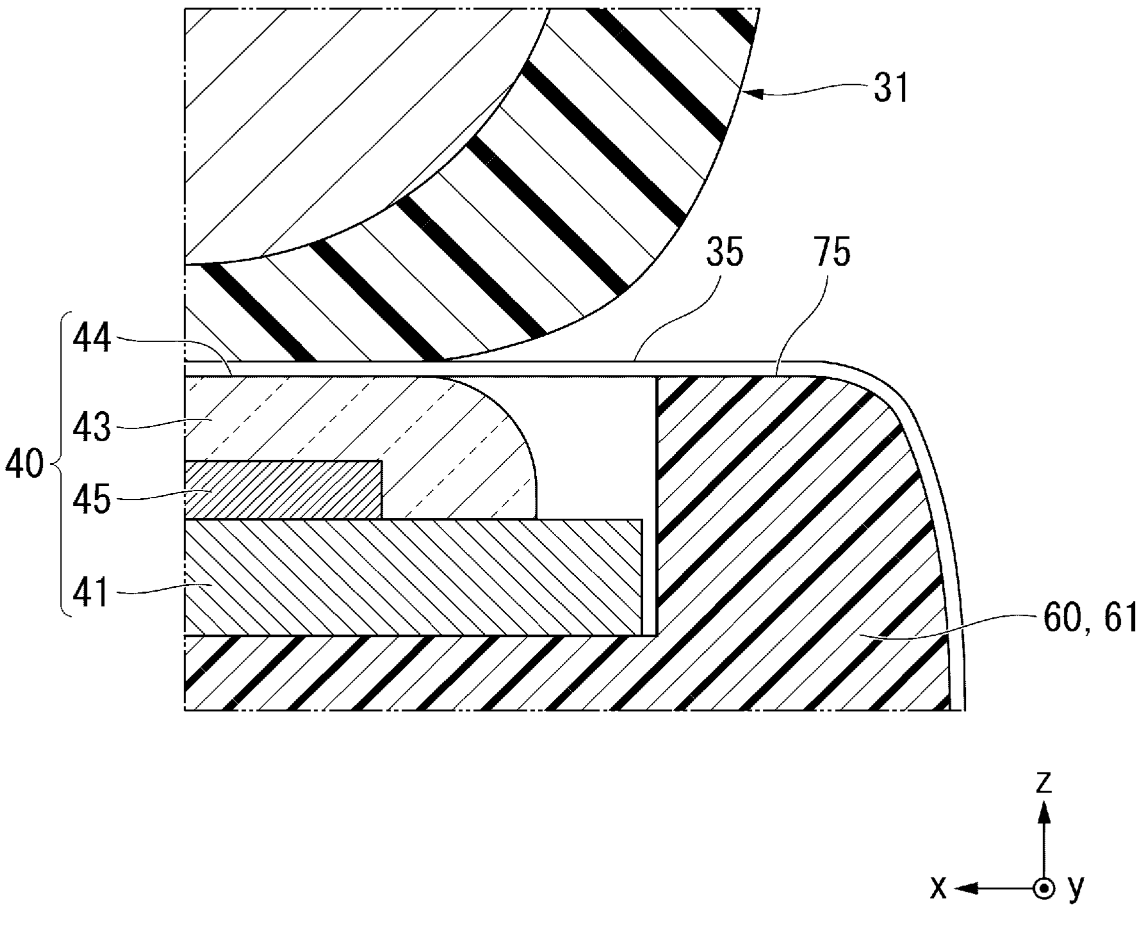
FIG. 9 is a section view of the fixing device taken along a IX-IX line in FIG. 7.
Figure 10:
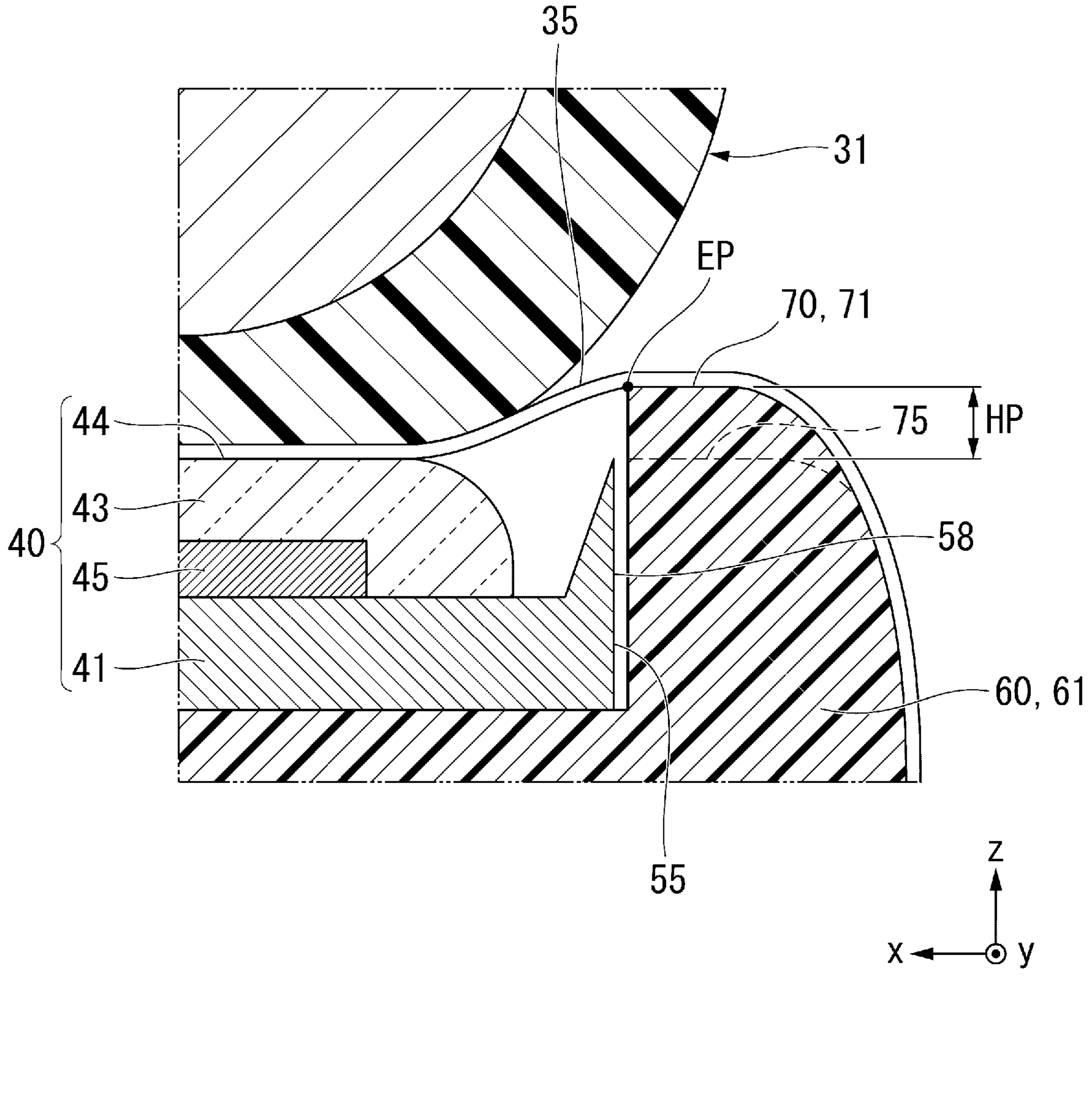
FIG. 10 is a section view of the fixing device taken along a X-X line in FIG. 7.

FIG. 8 is an enlarged view of a VIII part in FIG. 7. FIG. 9 is a section view of the fixing device taken along a IX-IX line in FIG. 7. FIG. 10 is a section view of the fixing device taken along a X-X line in FIG. 7. In FIGS. 9 and 10, a part further in the +x direction than the center in the x direction of the fixing device is not illustrated.

As illustrated in FIG. 8, the supporting member 60 includes projections 70 and low sections 75. The projections 70 project in the +z direction from the end faces in the +z direction of the upstream-side supporting section 61 and the downstream-side supporting section 62. The low sections 75 are the end faces in the +z direction of the upstream-side supporting section 61 and the downstream-side supporting section 62. The low sections 75 are present further in the −z direction than the projections 70.

As illustrated in FIG. 7, the projections 70 and the low sections 75 are arranged in the y direction. The projections 70 are present in the center in the y direction of the supporting member 60. The low sections 75 are present on both the sides in the y direction of the projections 70. As illustrated in FIG. 8, the projections 70 overlap at least a part of the first cut sections 55 of the substrate 41 in the y direction. In an example illustrated in FIG. 8, the projections 70 overlap the entire first cut sections 55 in the y direction. Length LP in the y direction of the projections 70 is larger than length LC in the y direction of the first cut sections 55.

As illustrated in FIG. 10, the projection 70 is present further in the +z direction than the low section 75. For example, height HP in the z direction from the low section 75 to the projection 70 is the same degree as the thickness in the z direction of the substrate 41. The end face in the +z direction of the heater unit 40 is the first surface 44. At least an end portion EP on the heater unit 40 side of the projection 70 is present further in the +z direction than the first surface 44. In an example illustrated in FIG. 10, the entire projection 70 is present further in the +z direction than the first surface 44.

The substrate 41 is cut from the base material 50 by a cutter. A burr 58 occurs in the first cut section 55 of the substrate 41. The burr 58 extends in the +z direction from the first cut section 55. The burr 58 has a sharp tip portion.

The projection 70 overlaps at least a part of the first cut section 55 in the y direction. The end portion EP on the heater unit 40 side of the projection 70 is present further in the +z direction than the first surface 44 of the heater unit 40. The tubular film 35 is in contact with the first surface 44. The projection 70 lifts the tubular film 35 further in the +z direction than the first surface 44. Since contact of the tip of the burr 58 and the tubular film 35 is suppressed, damage to the tubular film 35 is suppressed. Since the projection 70 is formed only in a part in the y direction, heat transfer from the heater unit 40 to the tubular film 35 is less easily hindered.

The upstream-side supporting section 61 and the downstream-side supporting section 62 of the supporting member 60 are present next to the heater unit 40 in the x direction. The projection 70 overlaps the entire first cut section 55 in the y direction. Contact of the tip of the burr 58 and the tubular film 35 is satisfactorily suppressed. Damage to the tubular film 35 is suppressed.

The pressurizing roller 31 is present in the +z direction of the tubular film 35. The pressure roller 31 is in contact with the tubular film 35 present on the first surface 44 of the heater unit 40. The pressurizing roller 31 is not in contact with the tubular film 35 present in the projection 70. Since the tubular film 35 is not sandwiched between the pressurizing roller 31 and the projection 70, stress concentration less easily occurs in the tubular film 35. Damage to the tubular film 35 is suppressed.

As illustrated in FIG. 9, the low section 75 is present in a position equivalent to the first surface 44 of the heater unit 40 in the z direction or is present further in the −z direction than the first surface 44. The pressurizing roller 31 is not in contact with the tubular film 35 present in the low section 75. Since the tubular film 35 is not sandwiched between the pressurizing roller 31 and the low section 75, stress concentration less easily occurs in the tubular film 35. Damage to the tubular film 35 is suppressed.

Figure 11:
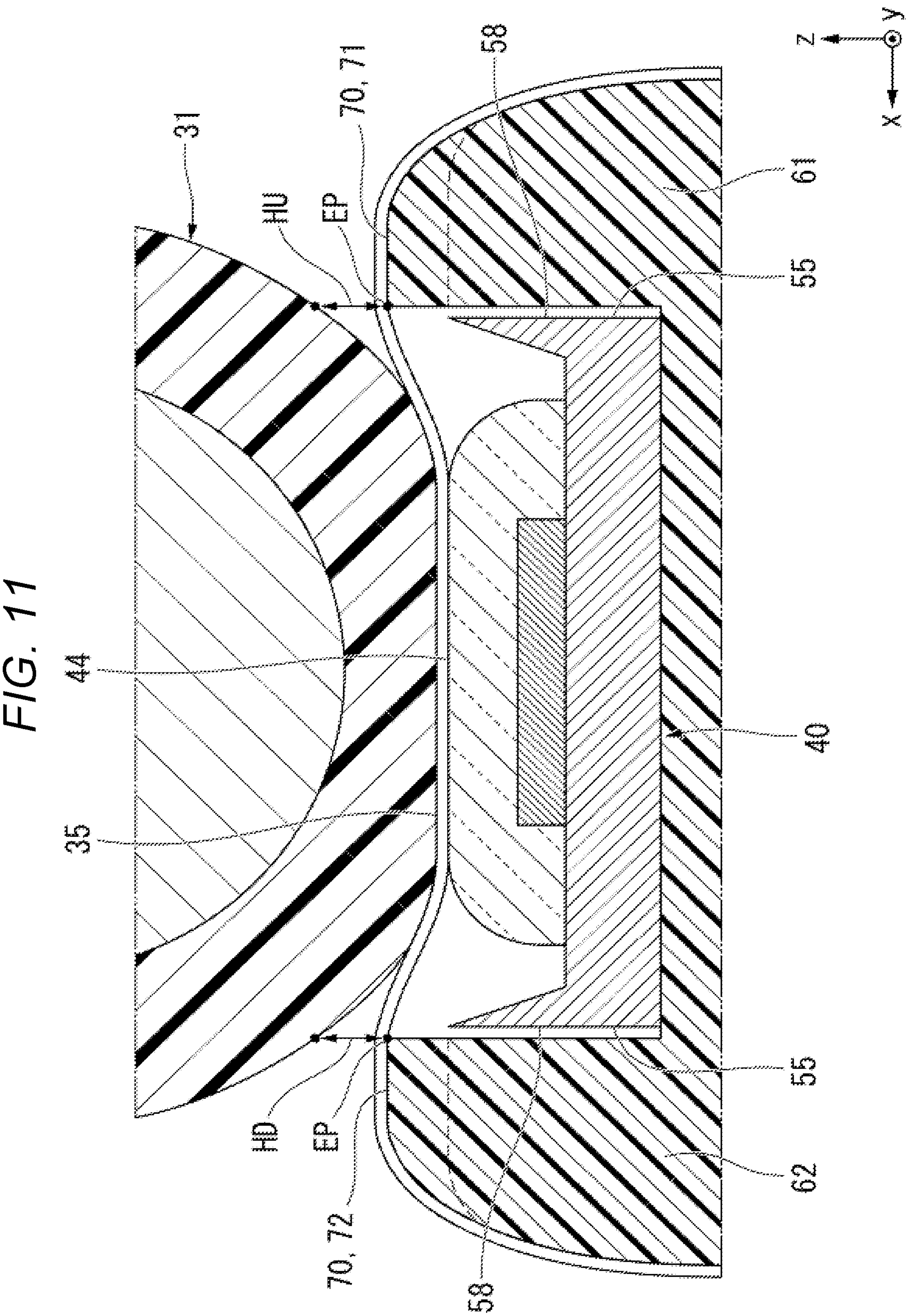
FIG. 11 is a section view of the fixing device taken along the X-X line in FIG. 7.

FIG. 11 is a section view of the fixing device taken along the X-X line in FIG. 7. The first cut sections 55 are present at both the end portions in the x direction of the substrate 41. The projection 70 includes a first projection 71 and a second projection 72. The first projection 71 is present in the upstream-side supporting section 61 in the −x direction of the heater unit 40. The second projection 72 is present in the downstream-side supporting section 62 in the +x direction of the heater unit 40.

Burrs 58 occur in the first cut sections 55 at both the end portions in the x direction of the substrate 41. The first projection 71 lifts, further in the +z direction than the first surface 44 of the heater unit 40, the tubular film 35 in the −x direction of the heater unit 40. The second projection 72 lifts, further in the +z direction than the first surface 44 of the heater unit 40, the tubular film 35 in the +x direction of the heater unit 40. Contact of the tips of the burrs 58 at both the end portions of the substrate 41 and the tubular film 35 is suppressed. Damage to the tubular film 35 is suppressed on both the sides in the x direction of the heater unit 40.

The distance in the z direction between the end portion EP on the heater unit 40 side of the first projection 71 and the pressurizing roller 31 is a first distance HU. The distance in the z direction between the end portion EP on the heater unit 40 side of the second projection 72 and the pressurizing roller 31 is a second distance HD. The first distance HU and the second distance HD are equivalent. The tubular film 35 is not sandwiched between the pressurizing roller 31 and the first projection 71 and the second projection 72. Damage to the tubular film 35 is equivalently suppressed on both the sides in the x direction of the heater unit 40. The first distance HU may be smaller than the second distance HD. The second distance HD may be smaller than the first distance HU. The tubular film 35 only has to be not sandwiched between the pressurizing roller 31 and the first projection 71 and the second projection 72.

As illustrated in FIG. 8, the first projection 71 and the second projection 72 are present in equivalent positions each other in the y direction. The first cut sections 55 at both the end portions of the substrate 41 are present in equivalent positions each other in the y direction. In this case as well, damage to the tubular film 35 is suppressed by the first projection 71 and the second projection 72.

As illustrated in FIG. 3, the heater unit 40 includes the second electric insulating layer 43 in the +z direction of the substrate 41. The first surface 44 of the heater unit 40 is a surface of the second electric insulating layer 43 on the opposite side of the substrate 41 in the z direction. A short circuit of the heat generating body 45 is suppressed by the second electric insulating layer 43. Slidability of the heater unit 40 and the tubular film 35 is improved by the second electric insulating layer 43.

As illustrated in FIG. 6, the substrate 41 includes the cutouts 54 in the outer circumference. The first cut sections 55 are present on the inner sides of the cutouts 54. The first cut sections 55 do not project further in the x direction than the outer circumference of the substrate 41. The heater unit 40 is reduced in size. The fixing device 30 including the heater unit 40 is reduced in size.

As illustrated in FIG. 4, the heat generating body 45 includes the center heat generating body 46 and the pair of end heat generating bodies 47. For example, in the case of the sheet S having small width in the y direction, the control section 6 causes only the center heat generating body 46 to generate heat. For example, in the case of the sheet S having large width in the y direction, the control section 6 causes the entire center heat generating body 46 and the entire pair of end heat generating bodies 47 to generate heat. In the fixing device 30 in the embodiment, the center heat generating body 46 present in the center in the y direction generates heat irrespective of a size of the sheet S.

As illustrated in FIG. 7, the projections 70 are present in the center in the y direction of the supporting member 60. As illustrated in FIG. 10, the projections 70 lift the tubular film 35 further in the +z direction than the first surface 44. A heat transfer rate from the heater unit 40 to the tubular film 35 is smaller in the center in the y direction of the heater unit 40 compared with the other portions. In contrast, in the fixing device 30 in the embodiment, the center heat generating body 46 present in the center in the y direction generates heat irrespective of a size of the sheet S. Heat transfer from the heater unit 40 to the tubular film 35 is facilitated in the center in the y direction. Deterioration in fixing performance of the fixing device 30 is suppressed.

Figure 12:
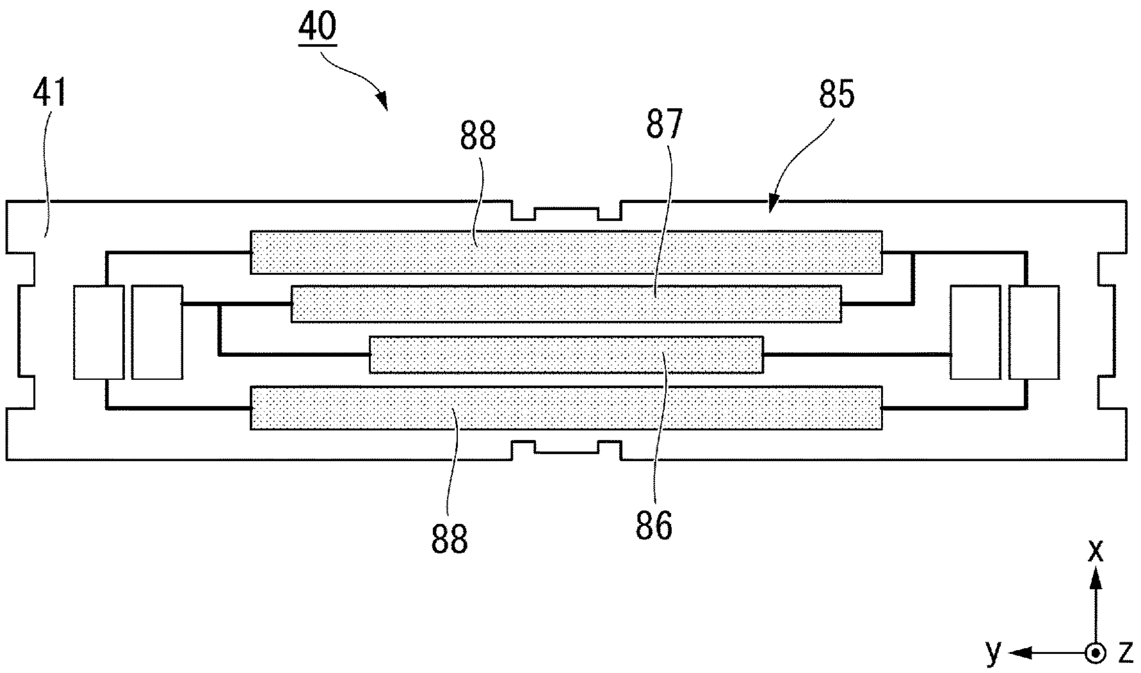
FIG. 12 is a plan view of a heater unit of a fixing device in a first modification of the embodiment.

A first modification of the embodiment is explained. FIG. 12 is a plan view of a heater unit of a fixing device in the first modification of the embodiment. Explanation regarding similarities of the first modification to the embodiment is sometimes omitted. The heater unit 40 in the first modification includes a heat generating body 85 on the surface of the substrate 41. The heat generating body 85 is elongated in the y direction. The heat generating body 85 has a plane-symmetrical shape with respect to an xz plane in the center in the y direction of the substrate 41.

The heat generating body 85 includes a first sub-heater 86, a second sub-heater 87, and a pair of main heaters 88. The first sub-heater 86, the second sub-heater 87, and the pair of main heaters 88 respectively have rectangular shapes having the y direction as a longitudinal direction. The pair of main heaters 88 is present at both the end portions in the x direction of the substrate 41. The first sub-heater 86 and the second sub-heater 87 are present in the center in the x direction of the substrate 41. As the length in the y direction of the heat generating body 85, the first sub-heater 86 is the shortest and the pair of main heaters 88 is the longest. The length in the y direction of the second sub-heater 87 is larger than the length of the first sub-heater 86 and is smaller than the length of the pair of main heaters 88.

For example, in the case of the sheet S having small width in the y direction, the control section 6 causes the first sub-heater 86 or the second sub-heater 87 to generate heat. For example, in the case of the sheet S having large width in the y direction, the control section 6 causes the pair of main heaters 88 to generate heat. All of the heaters of the heat generating body 85 are present in the center in the y direction of the substrate 41. The center in the y direction of the heater unit 40 generates heat irrespective of a size of the sheet S.

As illustrated in FIG. 7, the projections 70 are present in the center in the y direction of the supporting member 60. As illustrated in FIG. 10, the projection 70 lifts the tubular film 35 further in the +z direction than the first surface 44. A heat transfer rate from the heater unit 40 to the tubular film 35 is smaller in the center in the y direction compared with the other portions. In contrast, in the fixing device in the first modification, the center in the y direction of the heater unit 40 generates heat irrespective of a size of the sheet S. Heat transfer from the heater unit 40 to the tubular film 35 is facilitated in the center in the y direction. Deterioration in fixing performance of the fixing device is suppressed.

Figure 13:
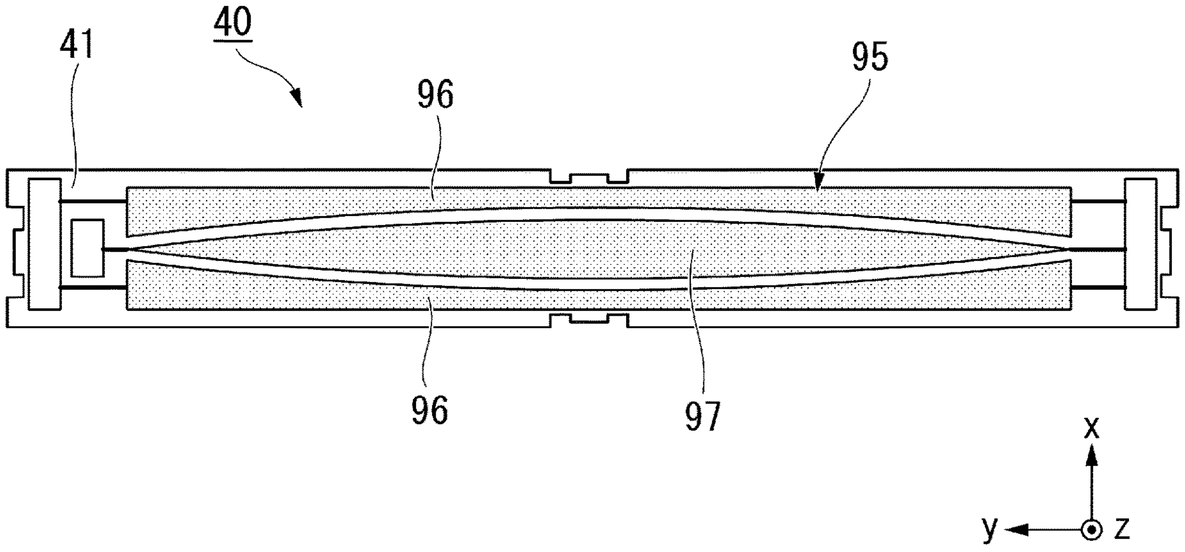
FIG. 13 is a plan view of a heater unit of a fixing device in a second modification of the embodiment.

A second modification of the embodiment is explained. FIG. 13 is a plan view of a heater unit of a fixing device in the second modification of the embodiment. Explanation of the second embodiment about similarities to the embodiment is sometimes omitted. The heater unit 40 in the second modification includes a heat generating body 95 on the surface of the substrate 41. The heat generating body 95 is long in the y direction. The heat generating body 95 has a plane-symmetrical shape with respect to the xz plane in the center in the y direction of the substrate 41.

The heat generating body 95 includes a pair of main heaters 96 and a sub-heater 97. The pair of main heaters 96 is present at both the end portions in the x direction of the substrate 41. The sub-heater 97 is present in the center in the x direction of the substrate 41. The lengths in the y direction of the pair of main heaters 96 and the sub-heater 97 are equivalent. The width in the x direction of the main heaters 96 is small in the center in the y direction and increases from the center to both the end portions in the y direction. A heat value of the main heaters 96 is large in the center in the y direction and decreases from the center to both the end portions in the y direction. The width in the x direction of the sub-heater 97 is large in the center in the y direction and decreases from the center to both the end portions in the y direction. A heat value of the sub-heater 97 is small in the center in the y direction and increases from the center to both the end portions in the y direction.

For example, in the case of the sheet S having small width in the y direction, the control section 6 causes the pair of main heaters 96 to generate heat. For example, in the case of the sheet S having large width in the y direction, the control section 6 causes the pair of main heaters 96 and the sub-heater 97 to generate heat. In the second modification, the pair of main heaters 96 generates heat irrespective of a size of the sheet S. A heat value of the pair of main heaters 96 is large in the center in the y-direction.

As illustrated in FIG. 7, the projections 70 are present in the center in the y direction of the supporting member 60. As illustrated in FIG. 10, the projection 70 lifts the tubular film 35 further in the +z direction than the first surface 44. A heat transfer rate from the heater unit 40 to the tubular film 35 is smaller in the center in the y direction compared with the other portions. In contrast, in the fixing device in the second modification, the pair of main heaters 96 generates heat irrespective of a size of the sheet S. A heat value of the pair of main heaters 96 is large in the center in the y direction. Heat transfer from the heater unit 40 to the tubular film 35 is facilitated in the center in the y direction. Deterioration in fixing performance of the fixing device is suppressed.

In the embodiment, the positions in the y direction of the pair of first cut sections 55 on the substrate 41 are equivalent to each other. In contrast, the positions in the y direction of the pair of first cut sections 55 may be different from each other. In the embodiment, one first cut section 55 is present at each of both the end portions in the x direction of the substrate 41. In contrast, a plurality of first cut sections 55 may be present at each of both of the end portions in the x direction of the substrate 41. The numbers of the first cut sections 55 at both the end portions in the x direction of the substrate 41 may be different from each other. The projections 70 only have to be formed in the supporting member 60 according to the positions and the number of the first cut sections 55 of the substrate 41.

According to at least one embodiment explained above, the fixing device 30 includes the projections 70 of the supporting member 60 overlapping at least a part of the first cut sections 55 of the substrate 41 in the y direction. The end portions EP on the heater unit 40 side of the projections 70 are present further in the +z direction than the first surface 44 of the heater unit 40. Consequently, damage to the tubular film 35 can be suppressed.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A fixing device comprising:

a tubular member extending in an axial direction;

a substrate having a first surface facing toward an inner surface of the tubular member in a first thickness direction, the substrate including a cut section at which the substrate is disconnected from a base material, the cut section being positioned at an end portion of the substrate in a first lateral direction, the substrate extending longitudinally along the axial direction; and a support in contact with the inner surface of the tubular member, the support including:

a projection longitudinally overlapping at least a portion of the cut section; and a low section longitudinally offset from the projection, the projection extending further in the first thickness direction than the low section and the first surface.

2. The fixing device of claim 1, wherein the support extends beyond the substrate in the first lateral direction.

3. The fixing device of claim 2, wherein the support extends beyond the substrate in a second lateral direction opposite the first lateral direction.

4. The fixing device of claim 1, wherein the projection longitudinally overlaps the entire cut section.

5. The fixing device of claim 1, further comprising a pressurizing body positioned to press the tubular member toward the substrate in a second thickness direction opposite the first thickness direction, wherein:

the pressurizing body is in contact with a first portion of the tubular member that contacts the first surface; and the pressurizing body is not in contact with a second portion of the tubular member that contacts the projection.

6. The fixing device of claim 5, wherein the pressurizing body is a roller configured to rotate relative to the substrate.

7. The fixing device of claim 1, wherein the low section is either (a) present in a position equivalent to the first surface in the first thickness direction or (b) offset from the first surface in a second thickness direction opposite the first thickness direction.

8. The fixing device of claim 1, wherein:

the cut section is a first cut section, the end portion is a first end portion, and the projection is a first projection;

the substrate further includes a second cut section positioned at a second end portion of the substrate in a second lateral direction opposite the first lateral direction; and the support further includes a second projection longitudinally overlapping at least a portion of the second cut section.

9. The fixing device of claim 8, wherein the substrate extends between the first projection and the second projection.

10. The fixing device of claim 9, wherein the first projection extends beyond the substrate in the first lateral direction and the second projection extends beyond the substrate in the second lateral direction.

11. The fixing device of claim 10, further comprising a pressurizing body positioned to press the tubular member toward the substrate in a second thickness direction opposite the first thickness direction, wherein a first distance in the first thickness direction between the first projection and the pressurizing body is equal to a second distance in the first thickness direction between the second projection and the pressurizing body.

12. The fixing device of claim 10, wherein the first projection and the second projection are present in equivalent longitudinal positions.

13. The fixing device of claim 1, wherein an electric insulating layer is formed on the substrate, the electric insulating layer defining the first surface.

14. The fixing device of claim 1, wherein:

the substrate includes a pair of cutouts extending inward from an outer circumference of the substrate; and the cut section is positioned between the cutouts.

15. The fixing device of claim 1, wherein the low section contacts the inner surface of the tubular member.

16. The fixing device of claim 1, wherein the support supports the substrate.

17. A fixing device comprising:

a tubular member;

a substrate having a first surface facing toward an inner surface of the tubular member in a first direction, the substrate including a cut section containing a burr; and a support including:

a first projection and a second projection each engaging the inner surface of the tubular member, the substrate extending between the first projection and the second projection, and the first projection and the second projection each extending further in the first direction than the first surface; and a low section adjacent the first projection and engaging the inner surface of the tubular member, the first projection extending further in the first direction than the low section.

18. The fixing device of claim 17, wherein the first projection and the second projection each extend further in the first direction than the burr.

19. An image forming apparatus including:

a sheet supply containing a sheet;

a transfer assembly configured to transfer a toner image onto the sheet; and a fixing device configured to fix the toner image to the sheet, the fixing device comprising:

a tubular member extending in an axial direction;

a substrate having a first surface facing toward an inner surface of the tubular member in a first thickness direction, the substrate including a cut section that is manufactured by disconnecting the cut section from a base material, the cut section being positioned at an end portion of the substrate in a first lateral direction, the substrate extending longitudinally along the axial direction; and a support in contact with the inner surface of the tubular member, the support including:

a projection longitudinally overlapping at least a portion of the cut section; and a low section longitudinally offset from the projection, the projection extending further in the first thickness direction than the low section and the first surface.

20. The image forming apparatus of claim 19, wherein the low section contacts the inner surface of the tubular member.

* * * * *